United States Patent
Hanzawa et al.

(10) Patent No.: US 6,447,893 B2
(45) Date of Patent: Sep. 10, 2002

(54) FIBROUS COMPOSITE MATERIAL AND PROCESS FOR PRODUCING THE SAME

(75) Inventors: Shigeru Hanzawa, Kagamihara (JP); Takao Nakagawa, Urawa (JP)

(73) Assignees: NGK Insulators, Ltd., Nagoya (JP); Across Co., Ltd., Warabi (JP)

(*) Notice: Subject to any disclaimer, the term of this patent is extended or adjusted under 35 U.S.C. 154(b) by 29 days.

(21) Appl. No.: 09/308,281

(22) PCT Filed: Oct. 7, 1998

(86) PCT No.: PCT/JP98/04523

§ 371 (c)(1),
(2), (4) Date: Jun. 30, 1999

(87) PCT Pub. No.: WO99/19273

PCT Pub. Date: Apr. 22, 1999

(30) Foreign Application Priority Data

| Oct. 9, 1997 | (JP) | 9-277772 |
| Apr. 22, 1998 | (JP) | 10-128226 |
| Jul. 6, 1998 | (JP) | 10-204237 |
| Sep. 4, 1998 | (JP) | 10-267462 |

(51) Int. Cl.[7] ............................................. B32B 18/00
(52) U.S. Cl. ........................ 428/293.4; 428/293.7; 428/294.1; 264/640; 264/657; 264/682
(58) Field of Search .......................... 428/293.4, 293.7, 428/294.1; 264/640, 657, 682

(56) References Cited

U.S. PATENT DOCUMENTS 6,030,913 A * 2/2000 Heine et al. ................. 501/88

FOREIGN PATENT DOCUMENTS

| GB | 1457757 | * 12/1976 |
| JP | 49-42705 | 4/1974 |
| JP | 63-25273 | 2/1988 |
| JP | 5-186266 | 7/1993 |
| JP | 5-186276 | 7/1993 |
| JP | 10-251065 A | 9/1998 |
| WO | 96/13471 | 5/1996 |

* cited by examiner

Primary Examiner—Elizabeth M. Cole
(74) Attorney, Agent, or Firm—Burr & Brown (57) ABSTRACT

A fiber-composite material (7) is comprised of a yarn aggregate (6) in which yarn (2A, 2B) including at least a bundle (3) of carbon fiber and a carbon component other than carbon fiber is three-dimensionally combined and integrally formed without separation from each other; and a matrix made of Si—SiC-based materials (4A, 4B, 5A, 5B) filled between the yarn (2A, 2B) adjacent to each other within the yarn aggregate (6). A method of preparing fiber-composite material is comprised of the steps of: producing bundles (3) of carbon fiber by impregnating a component of powdery carbon into the bundles (3) of carbon fiber, which eventually forms a matrix shape; forming a plastic coat around the bundles (3) of carbon fiber to obtain an intermediate material; molding the intermediate material to obtain a molded product by making the intermediate material into a yarn-shape and laminating a predetermined amount of the material, or burning the molded product to obtain a burned product; holding the molded product or the burned product and Si, at 1100 to 1400° C. in an atmosphere of inert gas; and heating the molded product or the burned product and Si to a temperature from 1450 to 2500° C., to thereby impregnate Si—SiC-based material into the inside of pores of the molded product or the burned product. A light and strong composite material is provided, which has excellent shock resistance, corrosion resistance in a strong oxidation and corrosion environments, creep resistance, spalling resistance, wear resistance, a low friction coefficient and a self-restorative ability by which a defect is healed.

9 Claims, 7 Drawing Sheets

(2 of 7 Drawing Sheet(s) Filed in Color)

FIBROUS COMPOSITE MATERIAL AND PROCESS FOR PRODUCING THE SAME

TECHNICAL FIELD

The present invention relates to a fiber-composite material that can be used as an ultra-high-heat-resistant structural material, and a highly lubricated and wear resistant material, and more particularly to a method of preparing the fiber-composite material.

BACKGROUND OF THE INVENTION

The development of space-round-trip aircraft and space planes in the space development field, high-temperature burning gas turbines in the energy field, and high-temperature gas furnaces and fusion reactors in the atomic energy field have experienced rapid development recently.

As an energy source next to nuclear energy and solar energy, application of hydrogen energy has been researched. In this process, expensive metals and fine ceramics have been examined as vessels for the reactions. High strength and high reliability (toughness, shock resistance) materials at medium or high temperatures (200 to 2000° C.), and durability that is not affected by the environment (corrosion resistance, oxidation resistance, radiation resistance) are demanded on these structural elements.

Today, as to ceramic materials having excellent heat resistance, silicon nitride and silicon carbide materials are being developed as new ceramics. However, these materials have a defect of brittleness as their intrinsic property, and they are extremely fragile if cracked and are also susceptible to thermal and mechanical shock.

As means for overcoming these defects inherent in ceramics, a ceramics-based composite material (CMC) that is combined with continuous ceramics-based fiber has been developed. Because the material has high strength and high toughness even at high temperature, and has excellent shock resistance and excellent durability against various environments, the research and development on the material is actively being done as the main ultra-high heat-resistant structural material chiefly in Europe and the USA.

For example, several hundred to several thousand pieces of long ceramic fibers having a diameter of about 10 $\mu$m are bundled to form fiber bundles (yarn), and the fiber bundles are arranged two or three dimensionally to form one-direction sheets (UJD sheet) or various kinds of cloths. These sheets or cloths are laminated to make a preformed product with a predetermined shape (fiber preform). To make a matrix within the preformed product by the CVI method (Chemical Vapor Infiltration: Chemical-vapor impregnating method) or by the inorganic- polymer-impregnation burning method, ceramic powder is filled into the above-mentioned preformed product by casting-molding method and then is sintered to make a matrix. Thus, ceramics-based fiber-composite material (CMC) that is combined with fibers in a ceramic matrix has been developed.

As specific examples of CMC, C/C composite and SiC fiber-reinforced Si—SiC composite are known. The former is produced by forming a matrix made of carbon in the gap among carbon fibers arranged in two-or three-dimensional directions, and the latter is produced by impregnating Si into the molded product comprising SiC fibers and SiC particles.

In British Patent Specification No. 1457757, the processing method of impregnating C/C composite with melting Si is disclosed. According to the method, the composite material that is a C/C composite impregnated with Si is supposed to be produced.

C/C composite has been employed in a wide scope of fields because of its excellent shock resistance owing to its high toughness, of its lightness and its excellent strength, but the composite has a limitation in being used as ultra-high heat-resistant structural material, because the composite cannot be used at high temperature in the presence of oxygen since the composite is composed of carbon. Further, the composite has a defect of low abrasion resistance when used as sliding elements because of its rather low hardness and low compression strength.

On the other hand, SiC fiber-reinforced Si—SiC composite is excellent in oxidation resistance, creep resistance and in spalling resistance, but the composite is easily scratched. Also, the SiC fiber has a problem that the fiber cannot be used as such structural material as a turbine blade that has a complex shape or a thin section, because of the low shock resistance of the fiber. The Sic fiber is inferior in lubricating property compared to Si—SiC or the like, and the drawing effect between the body material and fiber is small, which leads to the inferior toughness compared to C/C composite.

In the composite material described in the British Patent Specification No. 1457757, which is a C/C composite impregnated with Si, the common C/C composite that has been known is used, and the composite material has the structure that has a lot of fine pores in the whole body. That is, as described in Example 1 of the British Patent Specification No. 1457757, after carbon fiber is coated with phenol resin, the fiber is arranged in a mold, compressed and cured so that the desired fiber direction and shape are obtained, and then the obtained molded product is released from the mold and is heated at 800 to 900° C. in nitrogen atmosphere to carbonize the phenol resin. Thus, C/C composite, having the structure in which the fiber is orientated in one direction and in which the fiber is laminated, is obtained.

In such C/C composite, the phenol resin is carbonized to become a part of the carbon matrix, but because the rate of carbonization is about 50%, the C/C composite has a structure having a lot of fine pores in the whole body. When this C/C composite is dipped in melting Si to impregnate Si, although the vicinity of the surface thereof is permeated with Si, it is impossible to make Si permeate into the whole C/C composite, especially into the center part homogeneously. Therefore, the C/C composite has still the defect that is characteristic of the C/C composite material and that has not yet been solved.

In addition, when the C/C composite having such structure is impregnated with Si, the structure of carbon fiber near the surface is broken because of being directly contacted with high temperature melted Si. As a result, there arises a problem that the C/C composite loses its shock resistance, strength, high lubricant property and wear resistance.

SUMMARY OF THE INVENTION

The present invention has been made to solve the above-mentioned problem, and an object of the present invention is to provide a composite material having excellent shock resistance, corrosion resistance in strong oxidation and corrosion environments, creep resistance, spalling resistance, wear resistance, low friction coefficient, further, lightness and strength. Additionally, the present invention has a self-restorative ability by which a defect is healed under a certain condition.

The present invention provides a fiber-composite material comprising: a yarn aggregate in which yarn including at least a bundle of carbon fiber and a carbon component other than carbon fiber is three-dimensionally combined and integrally formed without separation from each other; and a matrix made of Si—SiC-based material filled between the yarn adjacent to each other within the yarn aggregate.

In the present invention, preferably, the matrix has a silicon carbide phase having grown along the surface of the yarn, the matrix has the silicon phase comprising silicon, and more preferably, the silicon carbide phase has grown between the silicon phase and the yarn.

The matrix may have an inclined composition in which the content rate of silicon becomes higher at increasing distances from the surface of the yarn. Preferably, the yarn aggregate includes a plurality of yarn array elements, each of the yarn elements is formed by arranging the plurality of yarns in a substantially parallel direction and two dimensionally, and each of the yarn array elements is laminated to form the yarn aggregate. Then, preferably, the yarn array elements adjacent to each other are structured such that the longitudinal direction of each yarn intersects with each other.

In the present invention, the matrices are connected to each other within the fiber-composite material to form a three-dimensional network structure. More specifically, the matrices are arranged in a substantially parallel direction and two-dimensionally within each of the yarn array elements, and the matrices having grown within each of the yarn array elements adjacent to each other are connected to each other, to thereby form a three-dimensional lattice of the matrices.

According to the present invention, there is provided a method of preparing fiber-composite material, comprising the steps of: producing bundles of carbon fiber by impregnating a component of powdery carbon and a component of organic binder into the bundles of carbon fiber, which eventually forms a matrix shape; forming a plastic coat around the bundles of carbon fiber to obtain an intermediate material; molding the intermediate material to obtain a molded product by making the intermediate material into a yarn-shape; then, forming the intermediate material into a sheet if circumstances require; and laminating a predetermined amount of the material, or burning the molded product to obtain a burned product; holding the molded product or the burned product and Si, at 1100 to 1400° C. in an atmosphere of inert gas; and heating the molded product or the burned product and Si to a temperature from 1450 to 2500° C., to thereby impregnate Si—SiC-based material into the inside of pores of the molded product or the burned product.

In the method, preferably, the molded product or the burned product and Si are held at a temperature of from 1100 to 1400° C. under a pressure of 0.1 to 10 hPa for one or more hours, and an inert gas is controlled to flow in an amount of 0.1 or more normal litters (NL) per 1 kg of the total weight of the molded product or the burned product and Si. Preferably, the molded product or the burned product and Si are heated to a temperature of from 1450 to 2500° C. under a pressure of 0.1 to 10

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 2(a)–2(b) are cross-sectional views schematically showing the microstructure of the main part of a fiber-composite material according to the present invention, in which

DETAILED DESCRIPTION OF THE INVENTION

A fiber-composite material according to the present invention comprises: a yarn aggregate in which yarn including at least a bundle of carbon fiber and a carbon component other than carbon fiber is three-dimensionally combined and integrally formed so as not to separate from each other; and a matrix made of Si—SiC-based materials filled among the yarn adjacent to each other within the yarn aggregate.

Thus, a fiber-composite material can be given toughness by using a C/C composite as the body material, which allows the fiber-composite material to have excellent shock resistance, lightness, high strength, high lubricant property and wear resistance. Therefore, it is possible to overcome the defect of low shock resistance which SiC fiber-reinforced Si—SiC composites have and to use the composites as the structural material that has a complex shape or a thin section. Since the C/C composite is produced in such a way that the C/C composite has continuous pores inside thereof, the Si—SiC based material, impregnated into the pores, has a continuous structure and a three-dimensional network structure. Therefore, any cut portion has higher wear resistance compared with the C/C composite that is the body material, and maintains the lubricant property the C/C composite has intrinsically.

By arranging the layer comprising Si—SiC-based material on the surface, it becomes possible to give oxidation resistance, creep resistance and spalling resistance to the fiber-composite material, to improve the low oxidation resistance a C/C composite has, and to use the fiber-composite material at high temperature even in the presence of oxygen. Thus, the fiber-composite material can be used as an ultra-high heat resistance structural material.

Hereinbelow, the novel fiber-composite material according to the present invention will be described.

The material is a material of new idea, which is made by giving improvement to the basic composition based on a so-called C/C composite.

The C/C composite produced in the following process is known. Several hundred to several ten thousand pieces, ordinarily, of carbon fiber having a diameter of about 10 μm are bundled to obtain fiber bundles (yarn), and the fiber bundles are arranged two-dimensionally to form a one-direction sheet (UD sheet) or various kinds of cloth. These sheets or cloths are laminated to form a preformed product with a predetermined shape (fiber preform). A matrix made of carbon is formed within the preformed product by the CVI method (Chemical Vapor Infiltration: Chemical-vapor impregnating method) or by the inorganic-polymer-impregnation sintering method to obtain a C/C composite.

The fiber-composite material has an excellent characteristic of maintaining the structure of carbon fiber without damaging the structure, which results from the fiber-composite material being produced by the specific method to be described below using a C/C composite as a body material . As described in the above-mentioned British Patent Specification No. 1457757, the fiber-composite material that is a C/C composite impregnated with Si is known. However, because the structure of carbon fiber is broken in the material, the properties of C/C composite such as shock resistance, strength, high lubricant property and wear resistance is lost.

The fiber-composite material according to the present invention is applied with the specific treatment in which a soft coat made from plastic such as thermoplastic resin is formed at least around the carbon fiber bundle to obtain a soft intermediate material, and the material is made to be yarn-shaped. Then the material is formed into a sheet if circumstances require, and the sheet is laminated and subjected to hot molding. High temperature, molten Si causes a contact reaction first with carbon particles except for the carbon fiber, or highly activated carbon generated by thermal decomposition of an organic binder and/or the plastic coat, and is not directly contacted with the carbon fiber bundles. Thus, the structure of the carbon fibers is not damaged.

Moreover, the fiber-composite material according to the present invention has the microstructure filled with the matrix made of Si—SiC-based material among the yarns that are adjacent to each other in the yarn aggregate.

In the present invention, Si—SiC-based material is a general term for the material that contains Si and silicon carbide as the main component. In the present invention, when Si is impregnated into the C/C composite or into the molded product made of the C/C composite, Si reacts mainly with the component of carbon, except for carbon fibers, or remained carbon in the composite, and is partially carbonized to grow Si a part of which is carbonized among the yarn aggregates. The matrix may contain some intermediate phases from the silicon phase in which silicon has almost purely remained to the almost-pure silicon carbide phase. That is, the matrix is typically composed of the silicon phase and the silicon carbide phase, but the matrix may contain the Si—SiC coexisting phase in which the carbon content changes with gradient based on silicon between the silicon phase and the silicon carbide phase. Si—SiC-based material is a general term for the material in which the carbon concentration changes from 0 mole % to 50 mole % in such Si—SiC system.

In the fiber-composite material, preferably, the matrix comprises the silicon carbide phase that has grown along the surface of the yarn. In this case, the strength of each yarn itself is further improved, and the fiber-composite material is hardly damaged.

In the fiber-composite material, preferably, the matrix comprises the silicon phase that is made of silicon, and the silicon carbide phase has grown between this silicon phase and the yarn. In this case, the surface of the yarn is strengthened by the silicon carbide phase. At the same time, the micro-dispersion of stress is further promoted because the central part of the matrix is composed of the silicon phase that has a relatively low hardness.

In the fiber-composite material, preferably, the matrix has an inclined composition in which the content rate of silicon becomes higher according to the distance from the surface of the yarn.

In the fiber-composite material, preferably, the yarn aggregate comprises more than one yarn array element, each of the yarn array elements being formed by arranging more than one yarn two-dimensionally in a nearly parallel direction, and each of the yarn array elements being laminated. The fiber-composite material, therewith, has a laminated structure in which the yarn array elements that have a plurality of layers are laminated toward one direction.

In this case, more preferably, the direction of the length of each yarn, in the yarn array elements adjacent to each other, intersects each other. The dispersion of stress is further promoted therewith. More preferably, the direction of the length of each yarn, in the yarn array elements adjacent to each other, intersects each other at right angles.

Preferably, the matrices form a three-dimensional network structure by being connected with each other in the fiber-composite material. In this case, more preferably, the matrices are arranged, in each of the yarn array elements, two-dimensionally in a nearly parallel direction, the matrices have grown, in each of the yarn array elements adjacent to each other, being connected with each other, and the matrices forms a three-dimensional lattice structure therewith.

The gap among the yarns adjacent to each other, may be filled with the matrix to the level of 100%, but the gap among the yarn may be partially filled with the matrix.

The component of carbon other than carbon fiber in the yarn is, preferably, carbon powder, and, more preferably, the carbon powder that is made to be graphite.

Figure 1:
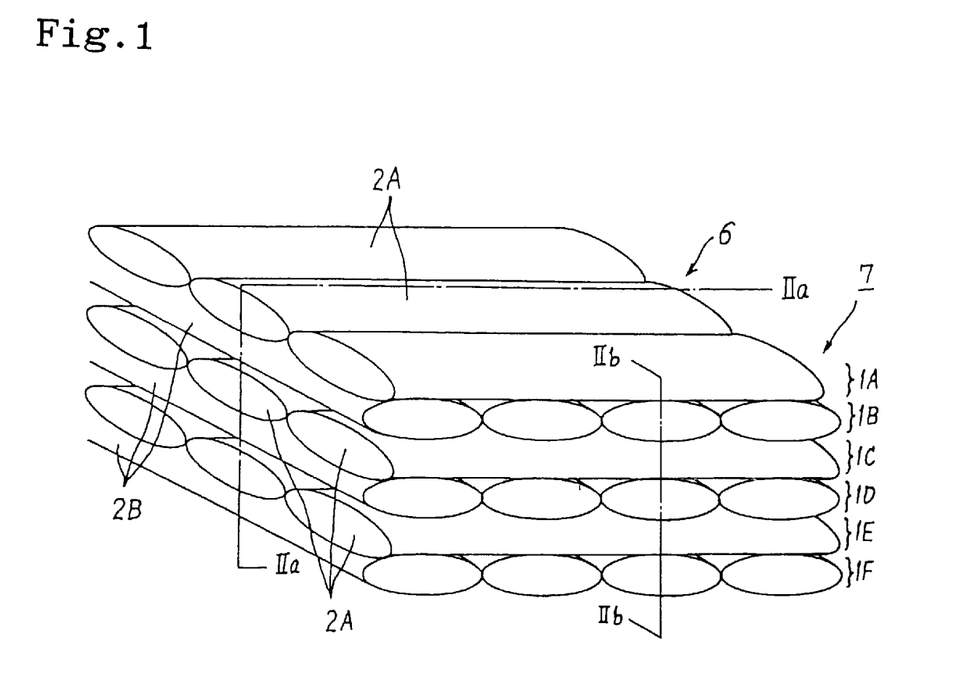
FIG. 1 is a perspective view schematically showing the configuration of yarn aggregate of a fiber-composite material according to the present invention.
Figure 2:
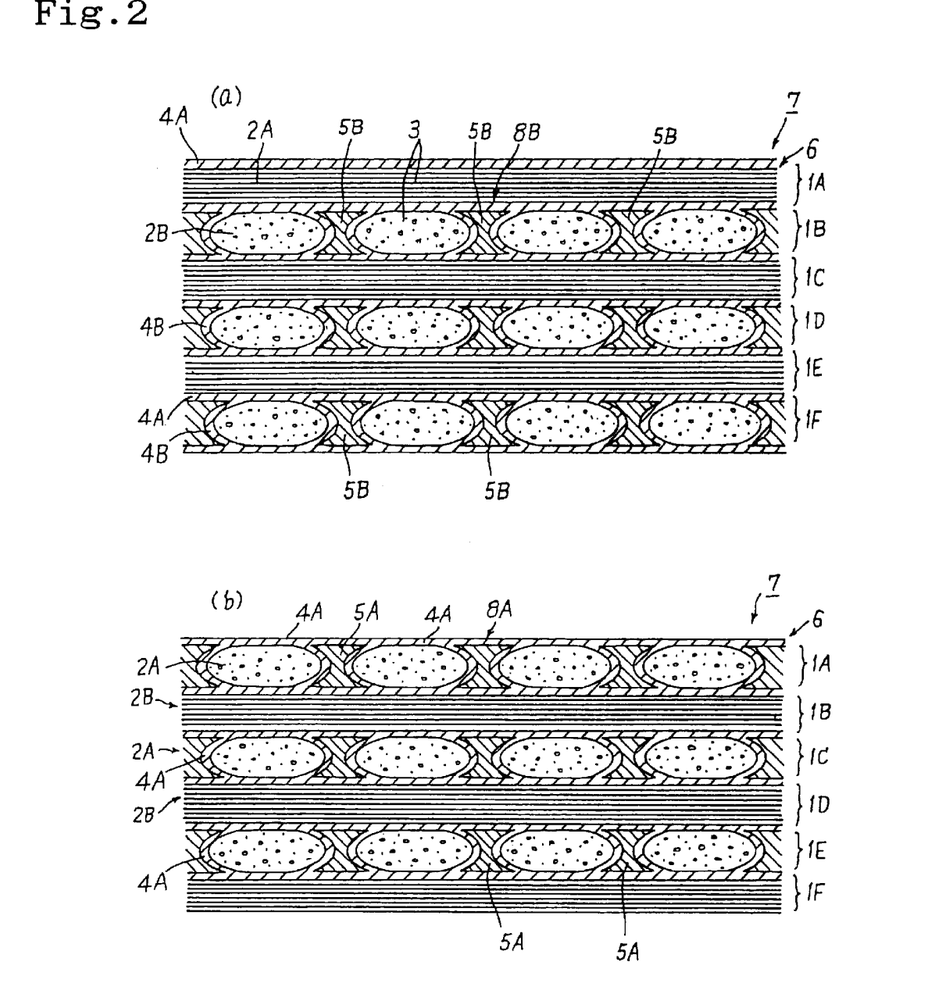
FIG. 2(a) is a cross-sectional view taken along the line IIa—IIa of FIG. 1.
FIG. 2(b) is a cross-sectional view taken along the line IIb—IIb of FIG. 1.
Figure 3:
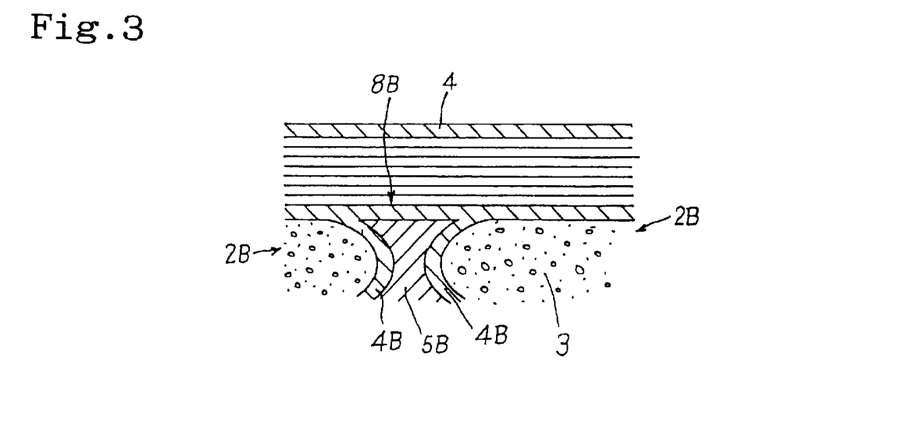
FIG. 3 is an enlarged view of a part of FIG. 2(a).

FIG. 1 is a perspective view schematically showing the idea of yarn aggregate. FIG. 2(a) is a cross-sectional view taken along the line IIa—-IIa of FIG. 1, and FIG. 2(b) is a cross-sectional view taken on line IIb—IIb of FIG. 1. FIG. 3 is an enlarged view of a part of taken from FIG. 2(a).

The skeleton of fiber-composite material 7 comprises the yarn aggregate 6. The yarn aggregate 6 is constructed by laminating the yarn array elements 1A, 1B, 1C, 1D, 1E, 1F upward and downward. In each of the yarn array elements, each yarn 3 is arranged two-dimensionally, and the direction of the length of each yarn is nearly parallel to each other. The direction of the length of each yarn, in each of the yarn array elements adjacent to each other upward and downward, intersects at right angles. That is, the direction of the length of each yarn 2A in each of the yarn array elements 1A, 1C, 1E is parallel to each other, and the direction of the length thereof intersects the direction of the length, at right angles, of each yarn 2B in each of the yarn array elements 1B, 1D, 1F.

Each yarn comprises fiber bundle 3 comprising carbon fiber and a component of carbon except carbon fiber. The yarn array elements are laminated to form the yarn aggregate 6 that is three-dimensional and lattice shaped. Each yarn has become substantially elliptical because of being crushed during the pressure molding process to be described below.

In each of the yarn array elements 1A, 1C, 1E, the gap among the yarns adjacent to each other is filled with the matrices 8A, each of the matrices 8A runs along the surface of the yarn 2A in parallel with the yarn. In each of the yarn array elements 1B, 1D, 1F, the gap among the yarns adjacent to each other is filled with the matrices 8B, each of the matrices 8B runs along the surface of the yarn 2B in parallel with the yarn.

In this example, the matrices 8A and 8B comprise the silicon carbide phases 4A, 4B that coat the surface of the yarn and the Si—SiC-based material phases 5A, 5B in which the rate of contained carbon is less than in the silicon carbide phases 4A, 4B. The silicon carbide phases may partially contain silicon. In this example, the silicon carbide phases 4A, 4B have grown also between the yarn 2A, 2B adjacent to each other up and down.

Each of the matrices 8A, 8B runs along the surface of the yarn in the long and narrow shape, preferably, linearly, and each of the matrices 8A and 8B intersects at right angles each other. The matrices 8A in the yarn array elements 1A, 1C, 1E and the matrices 8B in the yarn array elements 1B, 1D, 1F, which intersect the matrices 8A at right angles, are respectively connected in the gap part between the yarn 2A and 2B. As a result, the matrices 8A, 8B form a three-dimensional lattice as a whole.

Figure 4:
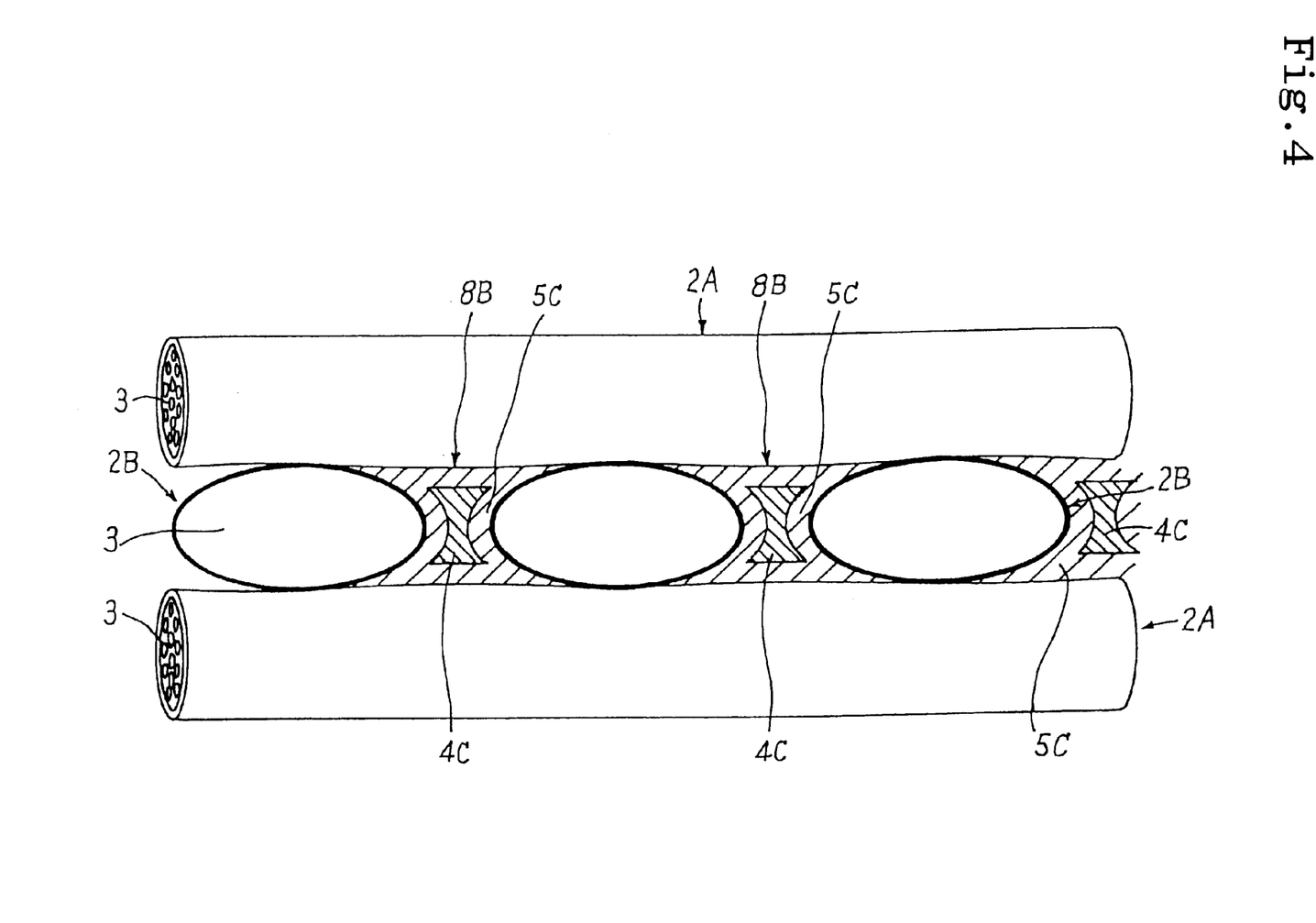
FIG. 4 is a partially sectional perspective view schematically showing the microstructure of the main part of a fiber-composite material according to another embodiment of the present invention.

FIG. 4 is a partially sectional perspective view of the main part of a fiber-composite material of another embodiment of the present invention. In this example, a silicon carbide phase does not substantially exist between the yarns 2A and 2B adjacent to each other up and down. In each of the yarn array elements, the matrix 8A or 8B is formed individually between the yarns 2A and 2A adjacent to each other, or between the yarns 2B and 2B adjacent to each other. The shapes of the matrices 8A and 8B are the same as the examples of FIG. 1 to FIG. 3 except that a silicon carbide phase does not exist between the yarns adjacent to each other up and down. Each of the matrices 8A and 8B individually comprises the silicon carbide phase 5C, that has grown in contact with the surfaces of the yarn 2A, 2B, and the Si—SiC-based material phase that has grown in the silicon carbide phase 5C separated from the yarn.

Each of the Si—SiC-based material phase, preferably, has an inclined composition in which the silicon concentration becomes lower according to the distance from the surface of the yarn, or preferably, comprises a silicon phase.

Figure 5:
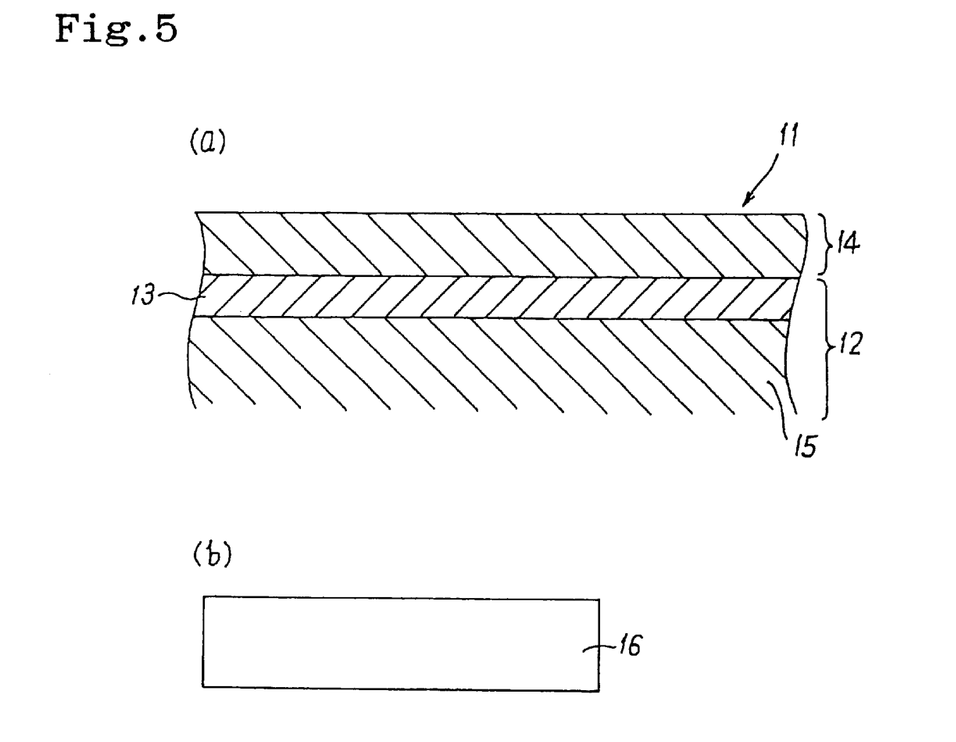
FIG. 5(a) is a sectional view of fiber-composite material 11.
FIG. 5(b) is a sectional view of fiber-composite material 16.

As shown in FIG. 5(a), the fiber-composite material 11 according to the present invention, preferably, comprises the C/C composite 15 and the fiber-composite material layer 13, that has grown on the surface of the C/C composite 15, is impregnated with Si, and the silicon layer 14 that has grown on the fiber-composite material layer 13. Reference numeral 12 shows the area of the body of C/C composite that has never been impregnated with Si. As shown in FIG. 5(b), the whole of the element 16 is preferably formed with the fiber-composite material according to the present invention.

In the case that the fiber-composite material layer 13 is provided, the thickness thereof is preferably 0.01 to 1 mm. Further, the Si concentration in the fiber-composite material layer preferably increases with increasing distance from the carbon fiber.

If the fiber-composite material according to the present invention contains 10 to 70% by weight of carbon fiber, the material may contain, for example, elements other than carbon such as boron nitride, boron, copper, bismuth, titanium, chromium, tungsten and molybdenum.

The thickness of the fiber-composite material layer 13, that is provided by the fact that Si—SiC is impregnated into the body material, is described in more detail.

With regard to the relations between a carbon fiber bundle 3, a silicon carbide phase 4B, and a silicon phase SB; the C/C composite 15, the layer 13, and the silicon layer 14 correspond to the carbon fiber bundle 3, the silicon carbide phase 4B, and the silicon phase 5B, respectively, in FIG. 2(a).

Here, the layer 13 has a thickness of preferably 0.01 to 1 mm, more preferably 0.05 to 1 mm.

At this time, the layer 13 is preferably formed in such a way that the Si concentration inclines in a range of from 0/90 to 90/100 from a portion of the carbon fiber bundle 3 toward a portion of the silicon phase 5B through the silicon carbide phase 4B.

Inclination of Si concentration is hereinbelow described in detail by taking a macroscopic view on a supposition of a block having a thickness of 200 mm.

In the present invention, since a laminate of carbon fiber bundles is impregnated with Si, the center of the block having a thickness of 200 mm has the lower Si concentration, and a portion around the surface layer has the higher Si concentration. Because of this, the most preferable mode can be realized by forming a molded or sintered body of a C/C composite so that the porosity becomes lower from the surface toward the inside and by disposing and forming a plurality of preformed sheets made of preformed yarn which has various binder pitches so that the binder pitch becomes higher from the inside toward the surface. In the case of FIG. 2(a), SiC concentration (=Si concentration) becomes lower in the order of "silicon carbide phase 4A of yarn array elements 1A layer">"silicon carbide phase 4A of yarn array elements 1B layer">"silicon carbide phase 4A of yarn array elements 1C layer">"silicon carbide phase 4A of yarn array elements 1D. Therefore, Si concentration inclines in a maximum thickness of about 100 mm in a macroscopic view. The Si concentration preferably inclines in a range of from 90/100 to 0/100 from the surface toward the inside of the layer 13.

The fiber-composite material according to the present invention, as described above, may contain one or two or more than two substances selected from the group consisting of boron nitride, boron, copper, bismuth, titanium, chromium, tungsten and molybdenum.

Because these substances have a lubricant property, by impregnating these substances into the body material made of C/C composite, even in the part of the body material impregnated with Si—SiC-based material, the lubricant property of the fiber can be maintained and the decline of physical properties can be prevented.

For example, the boron nitride content is preferably 0.1 to 40% by weight to 100% by weight of the body material made of C/C composite. It is because the effect of addition of lubricant property with boron nitride cannot be adequately obtained in the concentration that is less than 0.1 % by weight, and, in the case in which the concentration that is more than 40% by weight, the brittleness of boron nitride appears in the composite material.

The fiber-composite material according to the present invention can be produced preferably in the following process.

Carbon fiber bundles are made by making the bundles contain powdery binder-pitch and cokes that eventually become a matrix, and, further, if necessary, by making the bundles contain phenol resin powder. A soft coat made from plastic such as thermo-plastic resin is made around the carbon fiber bundle to obtain a soft intermediate material. The soft intermediate material is made to have a yarn-shape (Japanese Patent Application Laid-Open No. 2-80639), and is molded with a hot press at 300 to 2000° C. at atmospheric pressure to 500 kg/cm² to obtain a molded product after the necessary amount of the material is laminated. According to the demand, the molded product is carbonized at 700 to 1200° C., and is made to be graphite at 1500 to 3000° C. to obtain a burned product.

The carbon fiber may be any one of the pitch-based carbon fibers that are obtained by providing pitch for spinning use, melt-spinning the pitch, making the pitch infusible and carbonizing the pitch, and PNA based carbon fiber that is obtained by giving flame resistance to acrylonitrile polymer (or copolymer) fiber and by carbonizing the fiber.

As an organic binder that is necessary for making a matrix, thermosetting resins such as phenol resins and epoxy resins, tar and pitch may be used, and these may contain cokes, metal, metal compounds, inorganic and organic compounds. A part of the organic binder sometimes becomes a source of carbon.

After that, this molded product or this burned product, produced as in the above method, and Si are held in a temperature range of 1100 to 1400 under a pressure of 0.1 to 10 hPa in the furnace for at least one hour. Preferably, in the process, inert gas is allowed to flow to form a Si—SiC layer on the surface of the molded product or the burned product, in such a way that 0.1 or more than 0.1 (NL)(normal litter: corresponding to 5065 litter at 1200° C., under a pressure of 0.1 hPa) of the gas is allowed to flow per 1 kg of the total weight of the molded product, or the burned product, and Si. Thereafter, the temperature is raised to 1450 to 2500° C., preferably, to 1700 to 1800° C. to melt Si—SiC-based material, to impregnate the material into the inside of the pores of the above-described molded product or the burned product, and to form the material. In the process, in the case in which the molded product is used, the molded product is burned to obtain the fiber-composite material.

The molded product, or the burned product, and Si are held at a temperature of 1100 to 1400° C., under a pressure of 1 to 10 hPa for one hour or more. In the process, the amount of inert gas to be used is controlled in such a way that per 1 kg of the total weight of the molded product, or the burned product, and Si, 0.1 or more than 0.1 NL, preferably, 1 or more than 1 NL, more preferably, more than 10 NL of inert gas is made to flow.

Thus, in the burning process (namely, in the process in which Si is not yet melted or impregnated), because providing an atmosphere of inert gas removes the generated gas such as CO brought by the change in which inorganic polymer or inorganic substance become ceramics from the atmosphere of burning and prevents the contamination of the burning atmosphere caused by the outside factor such as $O_2$ or the like in the air, it is possible to keep low porosity in the fiber-composite material that is obtained by melting and impregnating Si in the subsequent process.

In the process in which Si is melted and impregnated into the molded product or the burned product, the surrounding temperature is raised to 1450 to 2500° C., more preferably to 1700 to 1800° C. Then, the pressure in the burning furnace is maintained preferably in a range of 0.1 to 10 hPa. The atmosphere in the furnace is preferably an inert gas or argon gas atmosphere.

As described above, because the combination of the usage of the soft intermediate material, the impregnation of silicon and the fusion of silicon brings about the retention of long and narrow pores between the yarn in the burned product or the molded product, silicon migrates into the inner part of the molded product or the burned product along the long and narrow pores. In the migration process, silicon reacts with carbon in the yarn and is gradually carbonized from the surface side of the yarn to produce the fiber-composite material according to the present invention.

The inclination of concentration in Si—SiC-based material in the whole fiber-composite material layer is controlled with the porosity and the diameter of the pores of the compact or the sintered body. For example, in the case where the concentration of Si—SiC-based material layer is made higher than any other portion at a depth of 0.01 to 10 mm from the surface layer of the fiber-composite material, the porosity in the portion having a desired high concentration in the compact or the sintered body is made to be in the range from 5 to 50% and the average diameter of the pores is made to be 1 μm or more. In the other portions, the porosity and the average diameter of the pores is made the same or lower than the portion having the high concentration. The porosity in the portion having the desired high concentration of the compact or sintered body is preferably 10–50% and the average diameter of the pores is preferably 10 μm or more. It is because the binder in the compact or the sintered body is hard to be removed if the porosity is less than 5%, and impregnation of the portion except for the portion having the desired high concentration with the Si—SiC-based material proceeds beyond the range of control of an amount of Si and other parameters of a production method such as a contact time.

In order to form the fiber-composite material layer on the surface of C/C composite, the molded product designed to have a porosity of 0.1 to 30% at least in the part near to the surface during burning is preferably used.

In order to make the porosity in the molded product or the burned product decrease from the surface toward the inside, more than one preformed sheet, made of preformed yarn of different binder-pitch, is arranged and molded in such a way that from the inside to the surface layer side the binder-pitch becomes larger.

In order to make the silicon concentration in the fiber-composite material layer have an incline, the burned product adjusted to have the porosity in the part near the surfaces which becomes lower from the surface to the inside, or the molded product adjusted to have the porosity at least in the part near the surface which becomes lower, during burning, from the surface to the inside are used to produce the fiber-composite material.

Characteristics and effects of a fiber composite material of the present invention are hereinbelow described.

(1) Since a fiber composite material of the present invention has a matrix containing a Si phase, its porosity can be controlled to be lower. If all Si reacts with C to produce SiC, pores corresponding to a difference of specific gravity are generated because specific gravities of Si, C, and SiC are 2, 2, and 3.2, relatively. Since the composite material of the present invention has a low porosity, it has a small surface area, and a combustion probability owing to an oxygen attack is lowered. Therefore, antioxidation ability of the composite material can be maintained in comparison with a material having a high porosity.

A fiber composite material of the present invention has a porosity of preferably 0.5–5%, more preferably 1–3%. When the porosity exceeds 5%, its antioxidation ability cannot be maintained. Further, large pores or many pores are present. Therefore, when the composite material is used as a sliding material, it increases the possibility that much of the other sliding material is scraped and kept inside the pores during sliding and that the composite material, which is a sliding material, breaks.

When the porosity is lower than 0.5%, the following phenomenon, which happens in a conventional SiC—C/C composite material, is prone to occur partially.

(2) Further, in the case of a conventional Si—C/C composite material, a porosity had to be increased so as to completely leave fibers or uniformly disperse fibers and SiC wholly.

The reason is as follows: Si is reacted with C at a higher temperature in order to completely fill the pores. Further, paths for permeating Si of a C/C substrate to be impregnated are uneven. This hinders a smooth flow of Si. Therefore, a reaction producing SiC completely proceeds in portions where the paths are clogged with Si, and fibers in the portions are destroyed. On the other hand, the reaction producing SiC proceeds very little in a periphery of fibers in portions where Si does not reach. Thus, the conventional composite material becomes very uneven on the whole.

On the contrary, in the composite material of the present invention, a flow path for permeating Si into the C/C substrate is very uniformly formed three-dimensionally. Therefore, the composite material is free from the problems of partially having a strong re action producing SiC or insufficiently having the reaction producing SiC. Thus, a homogeneous three-dimensional composite material can be obtained.

(3) Further, a fiber composite material of the present invention has a self-repairability by Si which remains with an inclination of a concentration besides SiC and C/C composite.

A material containing only SiC and C/C composite causes a strain between C and SiC during heating because their thermal expansion coefficients are different from each other, thereby forming a crack. The crack is never repaired.

On the other hand, in the case of a fiber composite material of the present invention, Si is present on the outer surface of SiC as described above. Therefore, self-repairing can be conducted by a penetration of molten Si into the crack, or self-glazing can be conducted by generation of $SiO_2$ by Si oxidation. That is, the material has self-repairability.

(4) Further, in a fiber composite material of the present invention, which contains Si, a thermal resistance or an electric resistance is prone to be changed more greatly when the material is reduced by excessive abrasion. Therefore, the material can exhibit a function of a sensor. Additionally, when a temperature of Si rises unusually in a high vacuum, Si evaporates at about 1400° C., which is sufficiently lower than 2700° C., at which SiC is sublimated. Therefore, a sensing function that can warn of an extraordinary state by confirming a change of weight or by changing of electrical, thermal properties can be exhibited.

Hereinafter, the present invention is illustrated in more detail by examples, however, the present invention is not limited to the examples.

The properties of the composite materials obtained by each example are measured by the methods as described below.

Method of Measuring Porosity $$\text{porosity } (\%) = [(W3-W1)/(W3-W2)] \times 100$$

By Archimedes Method

Dry weight (W1): measured after drying the sample at 100 for 1 hour in an oven.

Under water weight (W2): measured in water after boiling the sample in water and making water migrate into the pores completely.

Drinking weight (W3): measured at atmospheric pressure after making water migrate into the sample completely.

Method of Evaluating Oxidation Resistance

The oxidation resistance is measured by measuring the loss rate of weight, after 200 hours, of the sample cut out as a test piece of 60 mm×60 mm×5 mm (thickness), held for 200 hours at 1150° C. in a furnace (1%$O_2$, 99%$N_2$).

Method of Evaluating Compressive Strength

Compressive strength is calculated using the compression-loaded test piece with the following formula.

$$\text{Compressive strength} = P/A$$

(in the formula, P is the load when loaded with the maximum load, A is the minimum sectional area of the test piece.)

Method of Evaluating Durability Under Oxidative Condition at High Temperature

The weight of the cut out test piece, is measured, of 60 mm×60 mm×5 mm (thickness), held at 1200° C. using a mixed gas of 99% of Ar and 1% Of $O_2$.

Method of Evaluating Interlaminar Shear Strength

Interlaminar shear strength is calculated with the following formula, after three-point bending, regarding the distance of the test piece thickness h multiplied by 4 as the distance between the supports.

$$\text{Interlaminar shear strength} = 3P/4bH$$

In the formula, P is the maximum bending load when broken, and b is the width of the test piece.

Method of Evaluating Bending Modulus

Bending modulus is calculated with the following formula, using the initial gradient $P/\sigma$ of the straight part of load-deflection curve, after three-point bending, regarding the distance of the test piece thickness h multiplied by 40 as the distance between the supports.

$$\text{Bending modulus} = 1/4 \, L^3/bh^3 p/\sigma$$

(in the formula, b is the width of the test piece)

Method of Evaluating Self-restoration

Self-restoration is measured on the test piece annealed for 2 hours at 900° C., after making micro-cracking inside by applying repeated stresses of Max: 20Mpa to Min: 5 Mpa, 100,000 times.

Method of Evaluating Dynamic Coefficient of Friction

The frictional force Fs(N) is measured on the test piece of 60 mm×60 mm×5 mm (thickness) mounted on a rotary jig and pressed against the partner material (SUJ, 10 mm ball) with a constant load Fp(N).

The dynamic coefficient of friction is calculated with the following formula.

$$\text{Coefficient of friction} \, \mu = Fs/Fp$$

Method of evaluating specific abrasive wear

The weight untreated, Wa (mg) and the weight treated, Wb (mg) are measured on the test piece, size of which is 60 mm×60 mm×5 mm (thickness), mounted on a rotary jig and pressed against the partner material (SUJ, 10 mm ball) with a constant load P. Abrasive wear V ($mm^3$) is calculated with the following formula, using the density $\rho$ (g/$cm^3$) of the test piece.

$$V = (Wa\rho \cdot Wb)/\rho$$

Specific abrasive wear Vs ($mm^3$/N.km)) is calculated with the following formula, using abrasive wear V ($mm^3$), test load P (N) and sliding distance L (km).

$$Vs = V/(P \cdot L)$$

EXAMPLE 1

By impregnating phenol resin in carbon fibers pulled and aligned in one direction, about ten thousand carbon long fibers of diameter 10 μm were tied in a bundle to obtain a fibrous bundle (yarn). The yarn was arranged as shown in FIG. 1 to obtain a prepreg sheet.

Then, the prepreg sheet was laminated so as to have 50 layers and processed at 180° C. and at 10 kg/cm² with a hot press to cure the phenol resin and was burned at 2000° C. in nitrogen to obtain a c/c composite. The obtained c/c composite had a density of 1.0 g/cm³ and a porosity of 50%.

The c/c composite was then vertically placed in a carbon crucible filled with silicon powder of purity 99.8% and of mean particle size 1 mm. After that, the crucible was moved into a furnace. The c/c composite was processed to impregnate silicon into the composite and produce the fiber-composite material according to the present invention, under the following condition: the furnace temperature of 1300° C., the flow rate of argon gas as inert gas of 20 NL/minute, the furnace internal pressure of 1 hPa, the holding time of 4 hours and then the furnace temperature was raised to 1600° C. while the same furnace pressure was kept. In this Example, the whole c/c composite was changed to the fiber-composite material of the present invention.

The measured results such as density, porosity, shearing strength among layers, compression strength and bending modulus of the obtained fiber-composite material are shown in Table 1.

Each of the data were measured on a test piece cut from near the surface layer in which Si—SiC type material and C/C composite were adequately combined.

Figure 6:
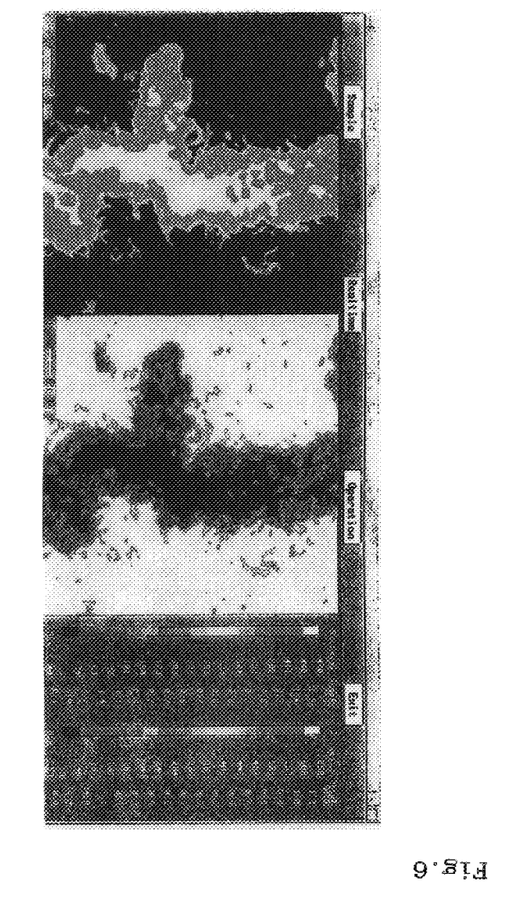
FIG. 6 is a color photograph of EPMA showing the structure of a ceramic material viewed in a sectional direction to the surface layer of a test piece of Example 1.
Figure 7:
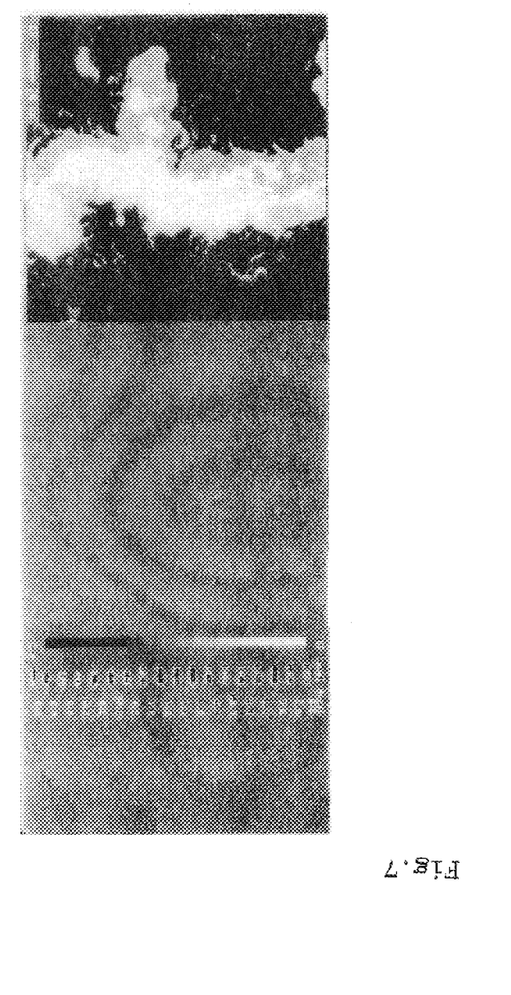
FIG. 7 is a color photograph of a reflective electronic image by SEM showing the structure of the ceramic material in the sectional direction of the surface layer of the test piece of Example 1.
Figure 8:
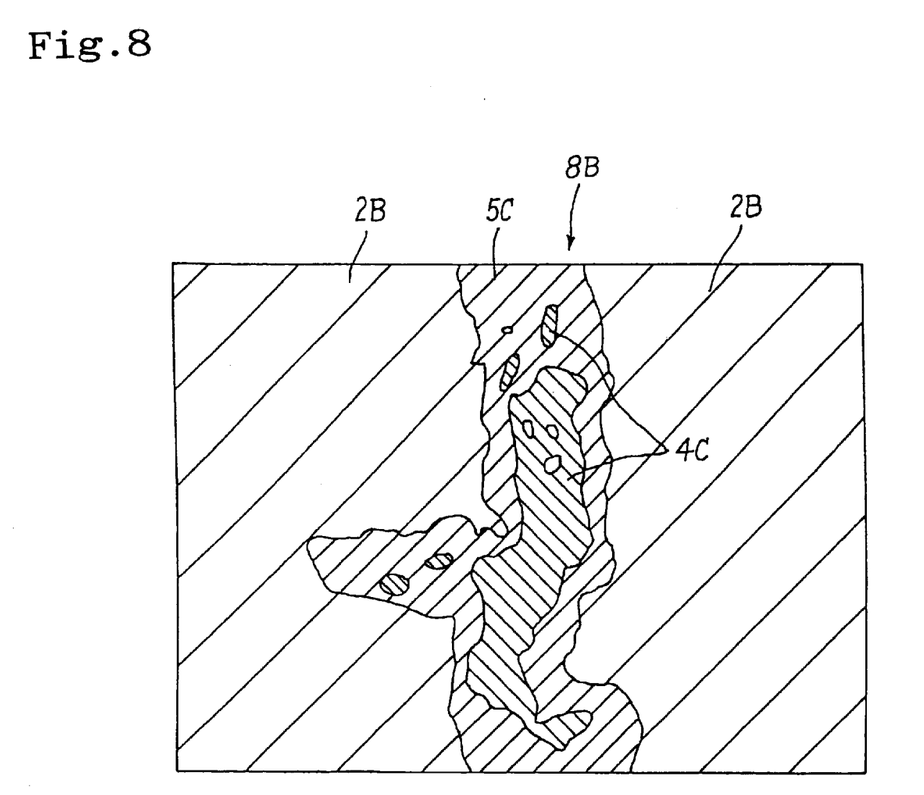
FIG. 8 is a view illustrating the microstructures shown in FIG. 6 and FIG. 7.

FIG. 6 is a color photograph of EPMA (electron beam micro analyzer) that shows the constitution of a ceramic material in the sectional direction to the surface layer of the test piece. FIG. 7 is a color photograph of reflective electronic image by SEM showing the constitution of the same ceramic material. FIG. 8 is a schematic cross sectional view based on FIG. 6 and FIG. 7 showing the microstructure at the boundary area between the yarn.

The color photographs of FIG. 6 and FIG. 7 show that Si and C have a micro-and fixed concentration gradient of about 0.01 to 0.1 mm scale. That is, as shown in FIG. 8, silicon-carbide phase 5C has grown along the surface of yarn 2B on the side near the surface of yarn 2B among matrix 8B and silicon phase 4C has grown inside the phase 5C. It is because the constitutional difference between the phases 4C and 5C can be observed from FIG. 7 and, as in FIG. 6, both of carbon and silicon exist in the phase 5C, but carbon is not observed in phase 4C.

EXAMPLE 2

The C/C composite produced in the same way as Example 1 was impregnated with phenol resin and was burned at 2000° C. in nitrogen after the resin was cured at 180° C. in an oven under normal pressure. By repeating the process further five times, a C/C composite was obtained. The obtained C/C composite had a density of 1.4 g/cm³ and a porosity of 30%.

After that, the obtained C/C composite was impregnated with Si in the same way as Example 1 to produce a fiber-composite material.

The measured results such as density, porosity, shearing strength among layers, compression strength and bending modulus of the obtained fiber-composite material are shown in Table 1. Each of the data were measured on a test piece cut from near the surface layer of the fiber-composite material in which Si—SiC type material and C/C composite were adequately combined.

EXAMPLE 3

A fiber-composite material comprising fiber-composite-material layers was produced.

A C/C composite was produced by the following process.

Preformed yarn was produced by the preformed yarn method (Japanese Patent Application Laid-Open No. 2-80639). One-direction-preformed-yarn sheets were produced using the preformed yarn. The sheets were laminated in such a way that the carbon fibers were intersected at right angles with each other, and were molded at 600° C. and at 100 kg/cm² with a hot press. The obtained C/C composite had density of 1.8 g/cm³ and porosity of 10%.

The obtained C/C composite was impregnated with Si in the same way as Example 1 to produce a fiber-composite material. The fiber-composite material layer had a thickness of 10 mm.

The measured results such as density, porosity, shearing strength among layers, compression strength and bending modulus of the obtained fiber-composite material are shown in Table 1. Each of the data were measured on a test piece cut from near the surface layer of the fiber-composite material in which Si—SiC type material and C/C composite were adequately combined.

EXAMPLE 4

A fiber-composite material comprising fiber-composite-material layers was produced in the same way as Example 1. However, boron nitride was added in the process of producing the C/C composite so that boron nitride is contained in the fiber-composite-material layers. The fiber-composite-material layer was designed to have a thickness of 30 mm.

The measured results such as density, porosity, shearing strength among layers, compression strength and bending modulus of the obtained fiber-composite material are shown in Table 1. Each of the data were measured on a test piece cut from near the surface layer of the fiber-composite-material in which Si—SiC type material and C/C composite were adequately combined.

EXAMPLE 5

A fiber-composite material comprising fiber-composite-material layers were produced in the same way as Example 1. In this Example 5, Si concentration in fiber-composite-material layer was designed to have a gradient in such a way that the concentration becomes low from the surface to the inside. The fiber-composite-material layer was planned to have a thickness of 3 mm. The concentration gradient of Si was designed to incline in a range of 100/0 to 0/100 compared with the amount of carbon fiber from the surface to the inside of the fiber-composite-material layer.

A C/C composite was produced by the following method.

Ten types of preformed yarn were produced at the rate of the binder pitch in the preformed yarn of 20 to 60 by the preformed-yarn method. One-direction preformed sheets were produced using this preformed yarn. The preformed sheet having the binder pitch rate of 20 was placed in the center of the thickness, the preformed sheet was placed in order in such a manner that the binder rate becomes high toward the surface layer, and the preformed sheet having the binder pitch rate of 60 was placed in the nearest side to the surface. Then, these preformed sheets were laminated in such a way that the carbon fibers were intersected at right angles with each other, and were molded at 600° C. and at 100 kg/cm² with a hot press. After that, these preformed sheets were burned at 2000° C. in nitrogen to obtain a C/C composite. The obtained C/C composite had density of 1.6 g/cm³ and porosity of 10%.

The obtained C/C composite was impregnated with Si in the same way as Example 1 to produce a fiber-composite material.

The measured results such as density, porosity, shearing strength among layers, compression strength and bending modulus of the obtained fiber-composite material are shown in Table 1. Each of the data were measured on a test piece cut from near the surface layer of the fiber-composite material in which Si—SiC type material and C/C composite were adequately combined.

Comparative Example 1

A C/C composite was produced in the same way as Example 3.

The measured results such as density, porosity, shearing strength among layers, compression strength and bending modulus of the obtained fiber-composite material are shown in Table 1.

TABLE 1

| | | Density of body material (g/cm³) | Porosity of body material (%) | Density (g/cm³) | Porosity (%) | Compressive strength (Mpa) | Bending modulus (Gpa) | Interlaminar shear strength (Mpa) | Specific abrasive wear (mm³/(N · km) | Dynamic coefficient of friction (μ) | Self-restoration | Oxidation resistance (%) |
|---|---|---|---|---|---|---|---|---|---|---|---|---|
| Example | 1 | 1.0 | 50 | 2.2 | 1 to 2 | 190 | 40 | 22 | 0.0 | 0.55 | 140/190 | 4 |
| | 2 | 1.4 | 30 | 2.1 | 1 to 2 | 180 | 45 | 20 | 0.0 | 0.18 | 120/180 | 6 |
| | 3 | 1.8 | 10 | 2.0 | 1 | 170 | 48 | 18 | 0.0 | 0.05 | 100/170 | 10 |
| | 4 | 1.4 | 50 | 2.1 | 1 to 2 | 200 | 55 | 23 | 0.0 | 0.26 | 115/200 | 6 |
| | 5 | 1.6 | 50 to 10 | 2.1 | 1 to 2 | 190 | 45 | 20 | 0.0 | 0.21 | 130/190 | 4 |
| Comparative Example | 1 | 1.8 | 10 | — | — | 140 | 50 | 16 | 0.55 | 0.05 | 0 (none)/150 | 100 |

Table 1 suggests that the fiber-composite materials (Examples 1 to 5) according to the present invention show good results in compression strength and in shearing strength compared with C/C composite (Comparative Example 1), and that the fiber-composite materials show almost the same result in bending modulus compared with C/C composite. In the fiber-composite materials according to the present invention, impregnating Si—SiC type material into C/C composite makes the C/C composite stronger in compression strength than C/C composite alone. It is thought that it is because the Si—SiC type material forms among carbon fibers.

The fiber-composite material including boron nitride (Example 4) showed a better result in bending modulus than other examples. Moreover, the fiber-composite material with the gradient of Si concentration in fiber-composite material layers (Example 5) showed a better result in self-restoration than other Examples.

Industrial Applicability

As described above, because the fiber-composite material according to the present invention has a configuration in which the fundamental structure is composed of body material made of C/C composite and the body material is impregnated with Si—SiC, the fiber-composite material has high-impact properties, lightweight properties and high strength properties, which are characteristics of C/C composites, and high oxidation resistance, high creep resistance and spalling resistance, which are not characteristic of C/C composites.

Further, in the fiber-composite material according to the present invention, making Si concentration in the fiber-composite material layer have an inclination in such a way that the concentration becomes low from the surface to the inside can remarkably improve corrosion resistance and strength in oxidation and corrosion environments, and healing function to the defects in the surface and subsurface parts.

In the fiber-composite material according to the present invention, making the fiber-composite material layer comprise boron nitride can prevent toughness deterioration of c/c composite portion by being impregnated with Si—SiC-based material.

What is claimed is:

1. A fiber-composite material comprising:
    a plurality of first yarns arranged in a first layer, each first yarn extending in a first longitudinal direction, and comprising a bundle of carbon fibers and an additional carbon component;
    a plurality of second yarns arranged in a second layer, each second layer extending in a second longitudinal direction and comprising a bundle of carbon fibers and an additional carbon component, said second longitudinal direction being substantially perpendicular to said first longitudinal direction; and
    a Si—SiC matrix for three-dimensional integrating the yarns to one another, said matrix being interposed between adjacent yarns within each layer and between yarns of adjacent layers;
    wherein said fiber-composite material is formed by a method comprising the steps of:
        forming a plastic coating around each of said first and second yarns;
        stacking the plurality of first and second yarns on one another along said first and second longitudinal directions, respectively, to form an intermediate product;
        heating the intermediate product to burn the plastic coatings and form a burned product; and
        infiltrating molten silicon into the pores of the burned product to form said fiber-composite material.

2. The fiber-composite material of claim 1, wherein said matrix has a silicon carbide phase grown along the surface of each yarn.

3. The fiber-composite material of claim 2, wherein said matrix has a silicon phase comprising silicon, and said silicon carbide phase is grown between said silicon phase and each yarn.

4. The fiber-composite material of claim 1, wherein said matrix has an inclined composition in which the amount of silicon increases with increasing distance from the surface of each yarn.

5. The fiber-composite material of claim 1, wherein said matrix defines a three-dimensional network structure throughout said material.

6. A method of preparing fiber-composite material, comprising the steps of:

producing bundles of carbon fiber by impregnating a component of powdery carbon into the bundles of carbon fiber, which eventually forms a matrix shape;

forming a plastic coat around the bundles of carbon fiber to obtain an intermediate material;

molding the intermediate material to obtain a molded product by making the intermediate material into a yarn-shape and laminating a predetermined amount of the material, or burning the molded product to obtain a burned product;

holding the molded product or the burned product and Si, at 1100 to 1400° C. in an atmosphere of inert gas; and heating the molded product or the burned product and Si to a temperature from 1450 to 2500° C., to thereby impregnate Si—SiC-based material into the inside of pores of the molded product or the burned product.

7. A method of preparing fiber-composite material as claimed in claim 6, wherein the molded product or the burned product and Si are held at a temperature of from 1100 to 1400° C. under a pressure of 0.1 to 10 hPa for one or more hours, and an inert gas is controlled to flow in an amount of 0.1 or more normal litters (NL) per 1 kg the total weight of the molded product or the burned product and Si.

8. A method of preparing fiber-composite material as claimed in claim 6, wherein the molded product or the burned product and Si are heated to a temperature of from 1450 to 2500° C. under a pressure of 0.1 to 10 hPa.

9. A method of preparing fiber-composite material as claimed in claim 7, wherein the molded product or the burned product and Si are heated to a temperature of from 1450 to 2500° C. under a pressure of 0.1 to 10 hPa.

* * * * *